United States Patent

Brent et al.

[11] Patent Number: 5,315,591
[45] Date of Patent: May 24, 1994

[54] METHOD AND APPARATUS FOR CONTROLLING CONGESTION IN PACKET SWITCHING NETWORKS

[75] Inventors: Jason B. Brent; Edward Hatala, both of Wiltshire; John Timms, Berkshire, all of Great Britain

[73] Assignee: Cray Communications Limited, Berkshire, Great Britain

[21] Appl. No.: 981,937

[22] Filed: Nov. 23, 1992

[30] Foreign Application Priority Data

Nov. 23, 1991 [GB] United Kingdom ............... 9124913

[51] Int. Cl.$^5$ ............................................. H04L 12/56
[52] U.S. Cl. ................................. 370/85.6; 370/94.1; 340/825.51
[58] Field of Search ................... 370/94.1, 94.2, 94.3, 370/85.6; 340/825.5, 825.51

[56] References Cited

U.S. PATENT DOCUMENTS

| | | | |
|---|---|---|---|
| 4,942,569 | 7/1990 | Maeno | 370/85.6 |
| 5,115,429 | 5/1992 | Hluchyj et al. | 370/94.1 |
| 5,208,805 | 5/1993 | Ochiai | 370/85.6 |

*Primary Examiner*—Douglas W. Olms
*Assistant Examiner*—Min Jung
*Attorney, Agent, or Firm*—Young & Thompson

[57] ABSTRACT

A system in which core information, for example in the form of a core block or blocks (C), is transmitted in a core packet (PC), and at least some enhancement information, for example, in the form of enhancement blocks (E), is transmitted in an enhancement packet (PE) which is separate from the core packet (PC) and is discardable to relieve congestion. Preferably, the core and enhancement packets have headers (H) which include a discard eligible marker (DE) to indicate whether or not the associated packet can be discarded. The enhancement blocks (E) may be distributed between the core packet and enhancement packet in accordance with congestion conditions, or the enhancement blocks may be incorporated only in the enhancement packet, and the actual number of enhancement blocks included are varied depending on congestion conditions. Preferably, the packets are transmitted in frame relay format and congestion forward (CF) and congestion backwards (CB) markers are used to feed back information of congestion conditions within a network to the packet assembler (7) forming the core and enhancement packets.

12 Claims, 1 Drawing Sheet

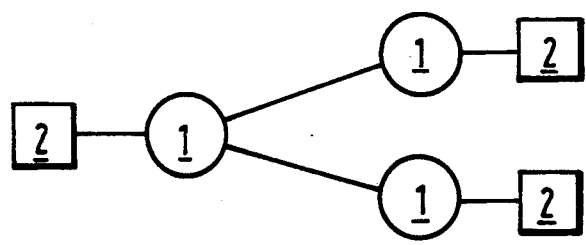
FIG.1.
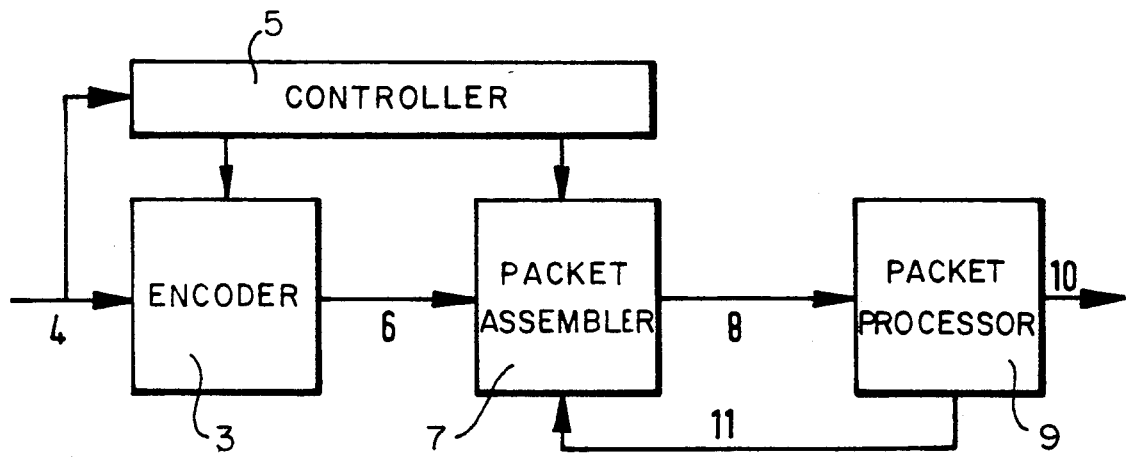
FIG.2.
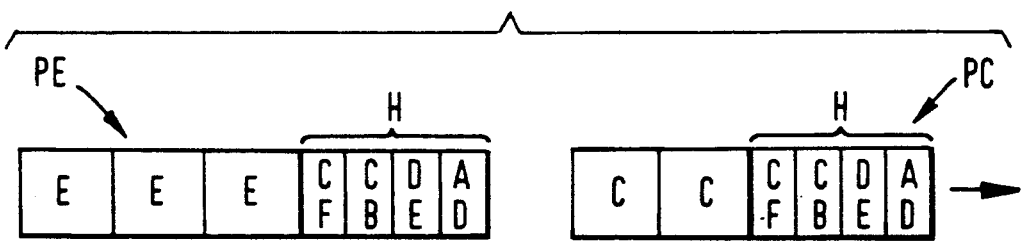
FIG.3a
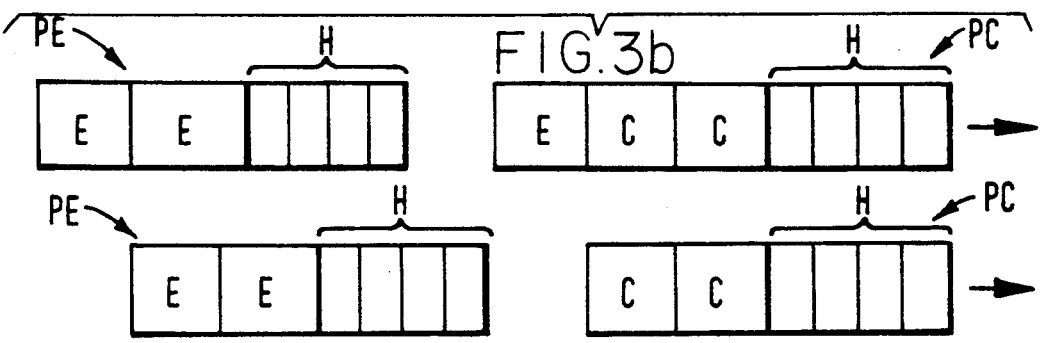
FIG.3b
FIG.3c

METHOD AND APPARATUS FOR CONTROLLING CONGESTION IN PACKET SWITCHING NETWORKS

TECHNICAL FIELD

This invention relates to a method of, and apparatus for, controlling congestion in a packet switching network.

BACKGROUND OF THE INVENTION

It is known to compress pulse code modulated (PCM) voice signals according to CCITT recommendation G.727 known as embedded ADPCM, by grouping the bits of a succession of voice samples into a predetermined number of blocks according to the significance of these bits. For example, five bit samples taken at a rate of 40 kbps over an interval of 16 milliseconds will produce 5 blocks of 128 bits each. The blocks containing the most significant bits and the next most significant bits are known as core blocks and the other blocks containing the less significant bits are known as enhancement blocks. Furthermore, according to CCITT recommendation G.764 known as the packetised voice protocols, it has been proposed to assemble the core blocks and associated enhancement blocks into a packet for transmission across a packet switched network, each packet including an address field by which it is routed through the network and a block dropping indicator which indicates which of the enhancement blocks can be discarded during periods of congestion in the network.

Discarding one or more enhancement blocks reduces the size of the packet and thereby relieves congestion. The quality of the voice signal derived from the shorter packets is reduced, but only in a progressive and manageable manner by first discarding the enhancement block containing the least significant bits, followed by the enhancement blocks of progressively more significant bits until only the core blocks remain.

A difficulty with this known system for controlling congestion in packet voice switching networks is that extra processing is involved at each node in analyzing the header of each packet and processing the packet to shorten it when required.

SUMMARY OF THE INVENTION

An object of the present invention is to provide an improved system, especially a simpler system, for controlling congestion in packet voice switching networks.

This object is achieved according to the present invention by providing a system in which core information, for example in the form of a core block or blocks, is transmitted in a core packet, and at least some enhancement information, for example, in the form of enhancement blocks, is transmitted in an enhancement packet which is separate from the core packet and is discardable to relieve congestion. Preferably, the core and enhancement packets have headers which include a discard eligible marker to indicate whether or not the associated packet can be discarded. The use of such a marker forms a part of the frame relay standard used in packet switching networks, and therefore it is conveniently available when adopting such a standard. Under congestion conditions, enhancement packets are then discarded dependent entirely upon the setting of their discard eligible marker, and no other analyzing or processing of the packets is involved.

According to a preferred feature of the invention, the enhancement blocks are distributed between the core packet and enhancement packet in accordance with congestion conditions so that effectively more or less of the enhancement blocks are discarded under congestion conditions.

Alternatively, if the enhancement blocks are incorporated only in the enhancement packet, the actual number of enhancement blocks included can be varied depending on congestion conditions so as to reduce the size of the enhancement packet to relieve congestion.

Preferably, by employing the frame relay standard, use can be made of the congestion forward and congestion backwards markers in a packet header to feed back information of congestion conditions within a network to the packet assembler forming the core and enhancement packets so that it can either vary the distribution of the enhancement blocks between the core and enhancement packets or can vary the number of enhancement blocks included in an enhancement packet.

DESCRIPTION OF THE DRAWINGS

The invention will now be described by way of example with reference to the accompanying drawings in which:

FIG. 1 is a schematic diagram of a packet switching network,

FIG. 2 is a schematic diagram of a system according to the invention for use with the network of FIG. 1, and FIGS. 3a), 3b) and 3c) are diagrams of core and enhancement packets showing the distribution of core and enhancement blocks between them under different congestion conditions.

MODE OF CARRYING OUT THE INVENTION

The packet switching network illustrated schematically in FIG. 1 comprises a plurality of interconnected packet switching nodes 1 some of which have input/output terminal devices 2 connected to them so that they can communicate with one another via the network. Data is transferred between the terminals 2 in the form of packets within a frame format known as frame relay, described hereafter.

FIG. 2 shows a terminal device 2 which is adapted to encode PCM voice signals and incorporate these into packets for transmission through the network in a frame relay format. An encoder 3 is adapted to encode PCM voice samples at input 4 according to CCITT recommendation G.727 so as to produce corresponding blocks of bits sorted according to the significance of the bits, the blocks for the most significant and next most significant bits being designated core blocks C, and the remaining blocks being designated enhancement blocks E. In this particular example, the sample bit rate is 40 kbps and 5 bit samples are taken over an interval of 16 milliseconds and produce 5 blocks of 128 bits each, two being core blocks C and three being enhancement blocks E. Encoders which adopt this CCITT recommendation in order to compress voice signals are generally available. A controller 5 controls the encoder and serves to discriminate voice signals at input 4 from data signals such as modem data signals so that only voice signals are encoded, the encoder being transparent to data signals which it passes directly to the output 6.

The blocks C, E produced by the encoder 3 pass via output 6 to a packet assembler 7 which forms a pair of packets from each group of five blocks, the two core blocks C being incorporated into a core packet PC, and the enhancement blocks E being incorporated into an enhancement packet PE, as shown in FIG. 3a). Each packet has associated with it an address field AD used to route the packet through the network, and a discard eligible marker DE to indicate whether or not the packet is discardable. The discard eligible marker DE is not set for the core packet PC so that this packet is not discardable, but the DE marker of the enhancement packet PE is set so as to make this packet discardable in the event of congestion in the network.

Packetisation of the voice signals in the packet assembler 7 is similar to the protocols of the CCITT recommendation G.764 except for the important difference that instead of the core and enhancement blocks being assembled in one packet and a block dropping indicator being used to indicate which of the enhancement blocks can be discarded, the core blocks and at least some of the enhancement blocks are assembled into separate packets and the discard eligible marker DE is used to indicate that the whole of the packet containing only enhancement blocks is discardable. The use of a pair of packets consisting of a core packet and an enhancement packet in this way, involves an increase in the packet overheads, but it has the great advantage of making it operationally simpler to reduce the volume of voice packet data under congestion conditions.

The core packets PC and enhancement packets PE generated by the packet assembler 7 pass via an output 8 to a further packet processor 9 which converts the packets to a frame relay format with a standard packet header and variable length frames which are transmitted into the network via an output 10. This format incorporates the CCITT recommendations of Q 922 relating to congestion control in frame relay networks. This involves the use of an information bit in the frame relay packet header which is equivalent to the DE marker referred to above. Thus, if there is congestion in the network, this will result in the enhancement packets PE being discarded because they have their DE bit set. Only the core packets PC will therefore be received at the destination terminal device 2 and converted into a voice signal.

Furthermore, if there is congestion in the network, this will result in those packets coming into the terminal device 2 from the congested node 1 having the equivalent CB bit set. The terminal device 2 makes use of this information to vary the allocation of the enhancement blocks E between the core packets PC and enhancement packets PE. In particular, the packet processor 9 responds to the CB bits of incoming packets by producing a control signal 11 which is fed back to the packet assembler 7 and serves to control its allocation of the three enhancement blocks E between the core packet PC and the enhancement packet PE so that under non-congestion conditions, one or more or all of the enhancement blocks E are incorporated into the core packet PC, as shown in FIG. 3b), but under congestion conditions these enhancement blocks E in the core packet are transferred to the enhancement packet PE. If all of the enhancement blocks E are incorporated in the core packet under non-congestion conditions, the output of the terminal device 2 will consist of core packets only and will be virtually indistinguishable from the known system. However, under congestion conditions, the separate core and enhancement packets will be produced. The transfer of the enhancement blocks E from the core packet PC to the enhancement packet PE can be controlled in a progressive manner with an increase in, or persistence of, congestion conditions until all of the enhancement blocks are incorporated into the enhancement packet PE as shown in FIG. 3a). Packets as shown in FIG. 3b) would then correspond to an intermediate level of congestion in the network.

The packet assembler 7 is under the control of the controller 5 which serves to inhibit the production of enhancement packets when an signals other than voice signals are received at the input 4. Data signals such as modem data signals are formed into core packets only.

According to an alternative embodiment of the invention, the control signal 11 controls the packet assembler 7 so that it incorporates only the core blocks C in the core packets PC and only enhancement blocks E in the enhancement packets PE, but the number of enhancement blocks E incorporated in the enhancement packet PE is reduced under congestion conditions, as shown in FIG. 3c), and may be progressively reduced with an increase in, or persistence of, congestion conditions.

We claim:

1. A method of controlling congestion in a packet transmission system comprising formatting information to be transmitted into blocks according to whether it is core information or enhancement information, transmitting the blocks of core information in core packets and transmitting at least some of the blocks of enhancement information in enhancement packets which are separate from the core packets and which are each marked with a discard marker, and discarding said enhancement packets under congestion conditions by reference to said discard marker only, so as to relieve congestion.

2. A method as claimed in claim 1 in which the enhancement packets include all of the blocks of enhancement information.

3. A method as claimed in claim 1 in which the number of blocks of enhancement information included in each enhancement packet is reduced under congestion conditions.

4. A method as claimed in claim 1 in which each core packet further includes at lest one block of enhancement information under conditions of non-congestion, said at least one block of enhancement information being transferred from the core packet to the enhancement packet under congestion conditions.

5. A method as claimed in claim 1 in which each core packet further includes at leas tone block of enhancement information under conditions of non-congestion, said at least one block of enhancement information being discarded from the core packet under congestion conditions.

6. A method as claim in claim 1 in which each packet has a discard indicator field which indicates whether or not it is discardable.

7. A method as claimed in claim 1 in which the packets are transmitted in a frame relay format with a standard header for all packets and variable length frames.

8. A method as claimed in claim 1 in which the packet transmission system is a packet switching network comprising a plurality of nodes each of which can experience congestion.

9. Apparatus for controlling congestion in a packet transmission system comprising encoder means for formatting information to be transmitted into blocks according to whether it is core information or enhancement information, packet assembler means for assembling the blocks of core information into core packets and at least some of the blocks of enhancement information into enhancement packets, said enhancement packets being separate from the core packets and being each marked with discard marker, congestion monitor means for monitoring congestion conditions in the system, and discard means for discarding said enhancement packets under congestion conditions by reference to said discard marker only.

10. Apparatus as claimed in claim 9 which includes means for controlling the packet assembler to transfer blocks of enhancement information, which is in the core packet under non-congestion conditions, from the core packet to the enhancement packet under congestion conditions.

11. Apparatus as claimed in claim 9 which includes means for controlling the packet assembler so that blocks of enhancement information, which is assembled into enhancement packets only, are reduced in number under congestion conditions so as to shorten the enhancement packet.

12. Apparatus as claimed in claim 9 including a packet switching network to which the packets are transmitted by the packet assembler means.

* * * * *